United States Patent
Kamps et al.

(10) Patent No.: US 7,629,432 B2
(45) Date of Patent: Dec. 8, 2009

(54) TERT-BUTYLHYDROQUINONE POLYCARBONATES

(75) Inventors: Jan Henk Kamps, Bergen op Zoom (NL); Edward Kung, West Chester, PA (US); Brian Mullen, Mount Vernon, IN (US)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 76 days.

(21) Appl. No.: 11/875,614

(22) Filed: Oct. 19, 2007

(65) Prior Publication Data

US 2008/0097071 A1 Apr. 24, 2008

Related U.S. Application Data

(60) Provisional application No. 60/862,555, filed on Oct. 23, 2006.

(51) Int. Cl.
*C08G 64/00* (2006.01)
*C08F 63/02* (2006.01)

(52) U.S. Cl. .............. 528/219; 156/325; 156/327; 428/354; 428/411; 428/412; 525/67; 528/196; 528/198

(58) Field of Classification Search .......... 156/325, 156/327; 428/412, 354; 525/67; 528/196, 528/198, 219
See application file for complete search history.

(56) References Cited

U.S. PATENT DOCUMENTS 6,608,165 B2 8/2003 Funakoshi et al.

2008/0004417 A1 1/2008 Jansen et al.
2008/0004418 A1 1/2008 Jansen et al.
2008/0004426 A1 1/2008 Brack et al.
2009/0088538 A1 4/2009 Campman et al.

FOREIGN PATENT DOCUMENTS

JP 3269017 A 11/1991
WO 00/47679 A1 8/2000

OTHER PUBLICATIONS

Brunelle et al., Preparation of Crystalline and Solvent Resistant Polycarbonates Via Ring-Opening Polymerization of Cyclic Oligomers, Macromol Symposium, 1994, pp. 117-124, Huthig & Wepf Verlag, Basel.
Brunelle, Daniel J., Solvent-resistant Polycarbonates, Trends in Polymer Science, May 1995, pp. 154-158, vol. 3, No. 5.
Brunelle et al., "Preparation of Crystalline and Solvent Resistant Polycarbonates Via Ring-Opening Polymerization of Cyclic Oligomers", Polymer Preprints, American Chemical Society, US, 1993, vol. 34, No. 1, pp. 73-74.

*Primary Examiner*—Terressa M Boykin
(74) *Attorney, Agent, or Firm*—Larson & Anderson, LLC

(57) ABSTRACT

The present invention relates to polycarbonate having repeat units derived from tert-butylhydroquinone (TBHQ). It has herein been found that polycarbonate having repeat units derived from TBHQ has superior properties as compared to polycarbonate having repeat units derived from other dihydroxy (hydroquinone-type) compounds. In one embodiment the present invention provides a polycarbonate having repeat units derived from tert-butylhydroquinone. The polycarbonate has a Mw (PC) of at least 9,000 g/mol.

19 Claims, 4 Drawing Sheets

Y axis = Mol% comonomer

TERT-BUTYLHYDROQUINONE POLYCARBONATES

CROSS-REFERENCE TO RELATED APPLICATIONS

This application claims the benefit of U.S. provisional application No. 60/862,555 filed on Oct. 23, 2006 which is incorporated herein by reference in its entirety.

BACKGROUND

Polycarbonate is a thermoplastic that has excellent mechanical properties such as impact resistance, heat resistance and transparency. Polycarbonates are widely used in applications ranging from football helmets to automobile parts to transparent security windows. More recently, polycarbonates have also proven to be the material of choice for optical media applications such as optical discs, for example compact discs (CD) and digital versatile discs (DVD). Conventional polycarbonates are usually produced by (1) an interfacial polymerization, in which bisphenol A (BPA) is reacted directly with phosgene or by (2) a melt polymerization process in which BPA is transesterified with a diaryl carbonate such as diphenylcarbonate (DPC) or an activated diaryl carbonate such as bismethylsalicylcarbonate (BMSC). For many applications, there has been a need for materials possessing the fundamental characteristics of transparency and toughness inherent in BPA polycarbonate but possessing, in addition, certain improvements in physical properties relative those possessed by bisphenol A polycarbonate (BPA-PC), for example birefringence. For some applications improved chemical resistance relative to BPA polycarbonate is required, for example in certain medical and automotive applications. Copolycarbonates are materials frequently possessing the fundamental traits of BPA polycarbonate, transparency and toughness, but in certain instances also possessing improved performance characteristics for a given application relative to BPA polycarbonate.

SUMMARY OF THE INVENTION

The present invention relates to polycarbonate comprising repeat units derived from tert-butylhydroquinone (TBHQ). It has herein been found that polycarbonate having a Mw (PC) greater than 9,000 and comprising repeat units derived from TBHQ is amorphous and has other superior properties as compared to polycarbonate comprising repeat units derived from other monomers and in particular other hydroquinone-type dihydroxy compounds.

In one embodiment, the present invention provides a polycarbonate comprising repeat units derived from a first dihydroxy compound having the structure:

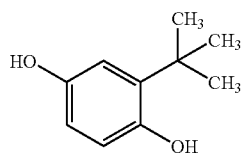

wherein the polycarbonate has a Mw (PC) of at least 9,000 g/mol.

In a second embodiment, the present invention provides a method of producing polycarbonate. The method comprises the steps of:

(A) forming a reaction mixture comprising a diaryl carbonate, a melt transesterification catalyst, and a dihydroxy component comprising a first dihydroxy compound having the structure:

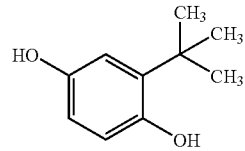

(B) treating the reaction mixture under melt polymerization conditions, and
(C) allowing the reaction mixture to react thereby forming polycarbonate, wherein the polycarbonate has a Mw (PC) greater than 9,000, thereby producing polycarbonate.

DETAILED DESCRIPTION OF INVENTION

Figure 1:
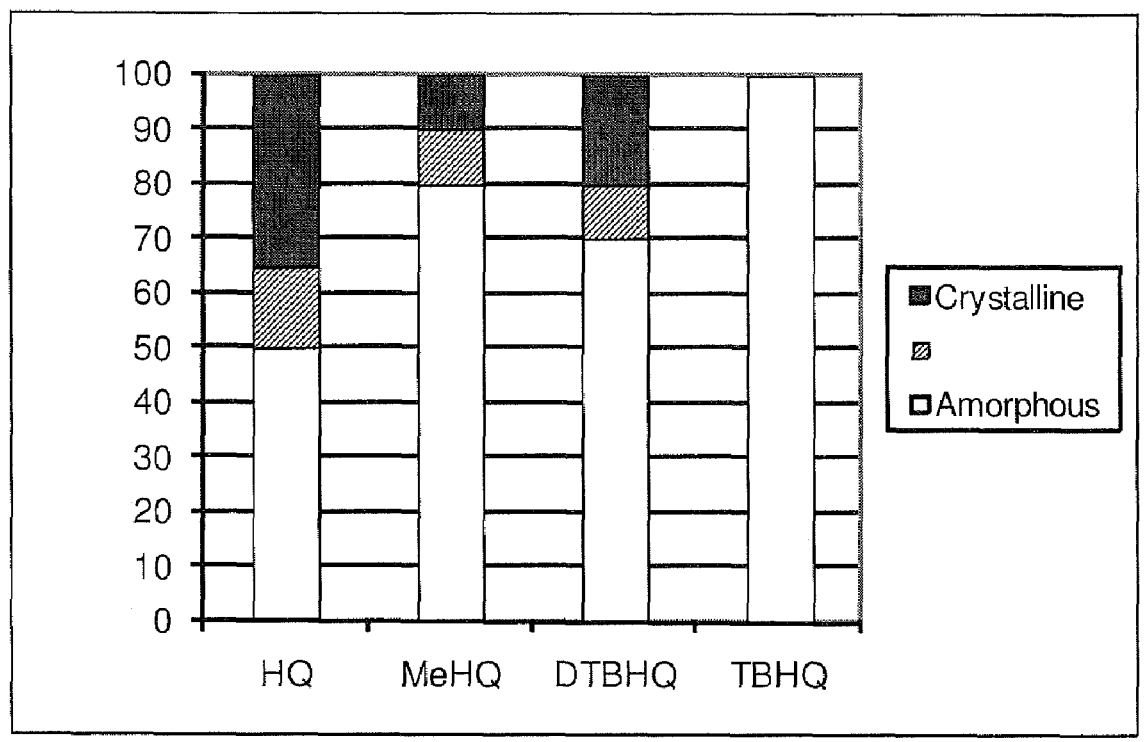
FIG. 1 is a bar chart showing amorphous and/or crystalline properties of examples from the example section.

The present invention may be understood more readily by reference to the following detailed description of preferred embodiments of the invention and the examples included herein. The present invention relates to polycarbonate comprising repeat units derived from tert-butylhydroquinone (TBHQ) and a method of making the same. It has herein been found that polycarbonate having a Mw (PC) greater than 9,000 and comprising repeat units derived from TBHQ is amorphous and has superior properties as compared to polycarbonate comprising repeat units derived from other hydroquinone-type dihydroxy compounds.

Definitions

As used in the specification and claims of this application, the following definitions, should be applied:

"a", "an", and "the" as an antecedent refer to either the singular or plural. For example, "an aromatic dihydroxy compound" refers to either a single species of compound or a mixture of such species unless the context indicates otherwise.

"Polycarbonate" refers to an oligomer or polymer comprising residues of at least one dihydroxy compound joined by carbonate linkages. The polycarbonate comprises residues of an aromatic dihydroxy compound and has a weight average molecular weight, Mw, that can be measured by gel permeation chromatography, GPC, using a crosslinked styrene-divinylbenzene column and calibrated to a BPA polycarbonate (PC) reference or to a polystyrene (PS) reference. The SEC system should be calibrated if the control samples are outside tolerance limits or after each significant hardware modification, (for example replacement of a column and/or tubing etc.). Calibration standards of 13 different PS standards (ranging from 1,000 to 2,000,000 g/mol) and toluene are prepared to set up a calibration curve. The concentration used is 1 mg/ml for each individual standard. Analyze calibration standards and prepare a calibration curve based on the results. If results must be expressed as BPA-PC molecular mass, an additional calibration line should be constructed using at least 6 known broad molecular weight PC standards, creating a conversion factor from PS numbers to PC numbers.

It is noted that in one embodiment the polycarbonate's Mw (PC) (i.e. measured by GPC relative to BPA polycarbonate) is roughly one half the polycarbonate's Mw (PS) (i.e. measured by GPC relative to polystyrene). The polycarbonate will have a Mw (PC) of at least 9,000 g/mol. In certain embodiments of the invention, the polycarbonate will have a Mw (PC) in a range between 9,000 g/mol and 160,000 g/mol. In specific embodiments, the Mw (PC) is between 10,000 g/mol and 160,000 g/mol, for example between 12,000 g/mol and 160,000 g/mol, and preferably between 15,000 and 160,000 g/mol. In another embodiment, the Mw (PC) is between 20,000 g/mol and 102,000 g/mol. The term "polycarbonate" encompasses poly(carbonate-coester) polymers. Nothing in the description and claims of this application should be taken as limiting the polycarbonate to only one dihydroxy residue unless the context is expressly limiting. Thus, the application encompasses copolycarbonates with residues of 2, 3, 4, or more types of dihydroxy compounds.

"polycarbonate oligomer mixture" as it is used herein to describe the reaction mixture within the oligomerization system is herein understood to mean that at least partial reaction has occurred to produce polycarbonate oligomer having at least from 2 to 40 repeat units derived from dihydroxy compound(s). The polycarbonate oligomer mixture comprises a polycarbonate oligomer, a byproduct phenolic compound, and unreacted reactant from the initial reactants.

"Amorphous polycarbonate" is understood to mean that the polycarbonate does not form crystalline structures upon being cooled. In one embodiment, the amorphous polycarbonate will have no melting point (Tm). In another embodiment no melting endotherms or crystallization exotherms are found when the material is tested via DSC according to ISO 11357.

"Dihydroxy compound(s)" include both aromatic and non-aromatic dihydroxy compounds.

"Repeat units" refers to the part of the dihydroxy (of in the case of a co-polyestercarbonate, the diester) compound that is incorporated into the polycarbonate after reaction to form the polymer linkages. Such repeat units are referred to as "derived from" the corresponding dihydroxy (or diester) compound.

"Tert-butylhydroquinone", "Tertiary Butyl Hydroquinone", or "TBHQ" is a dihydroxy compound and has the following structure:

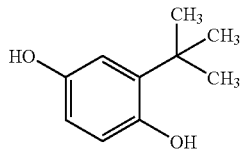

Tertiary Butyl Hydroquinone (CAS#1948-33-0). Commercial suppliers include; Dalian (China). Hunan (China), Jan Dekker (the Netherlands), Camlin (India), and Acros.

"BPA" is herein defined as bisphenol A or 2,2-bis(4-hydroxyphenyl)propane.

It has herein been found that high molecular weight polycarbonate comprising repeat units derived from a tert-butyl hydroquinone (TBHQ) monomer is an amorphous polymer. This is a surprise result because other quinone-type monomers have been found to cause crystallization. TBHQ polycarbonates also offer improved optical properties with lower refractive index and less refractive index dispersion (i.e. high Abbe number) compared to BPA homopolycarbonate. Unlike other quinone-type monomers, TBHQ will not cause crystallization, even at high loadings. See Table 1 and FIG. 1. Also included in Table 1 is a comparison to BPA homopolycarbonate. Although BPA homopolycarbonate is normally considered an amorphous polymer, it can be crystallized as seen in the results of solvent cast films; conversely, TBHQ polymer in accordance with the invention cannot be crystallized even when cast from a solvent.

Furthermore, the prior art discloses low molecular weight polycarbonate comprising repeal units derived from TBHQ dihydroxy. See Brunelle, Daniel J. "Solvent-Resistant Polycarbonates", *Trends in Polymer Science* 1995, 3(5), 154-158. See also, Brunelle, Daniel J.; Krabbenhoft, Herman O.; Bonauto David K. *Macromol. Symp.* 1994, 77, 117-124. These polycarbonates are crystalline or semi-crystalline as indicated by the fact that they have melting points. Furthermore, these polymers are low molecular weight (i.e. Mw (PC) of less than 9,000 g/mol) polymers due to the fact that they are produced via the interfacial polymerization process. This is confirmed in Examples 51 and 52 below. The inventors have found that polycarbonate comprising repeat units derived from TBHQ that has a Mw (PC) of greater than 9,000 can be prepared by the melt polymerization process. This polycarbonate is amorphous.

Polycarbonate:

In one embodiment, the present invention provides a polycarbonate comprising repeat units derived from a first dihydroxy compound having the structure:

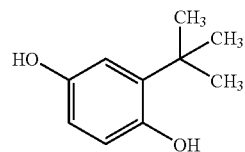

wherein the polycarbonate has a Mw (PC) of at least 9,000 g/mol.

The inventors have herein found that an amorphous polymer can be prepared where the polycarbonate has an Mw (PC) of at least 9,000 g/mol. In one embodiment the polycarbonate has a Mw (PC) greater than 10,000 g/mol. more preferable greater than 12,000 g/mol, greater than 15,000 g/mol, greater than 20,000 g/mol, greater than 25,000 g/mol. In specific embodiments, the Mw (PC) is between 10,000 g/mol and 160,000 g/mol, for example, between 12,000 g/mol and 160,000 g/mol, and preferably between 15,000 and 160,000 g/mol. In another embodiment, the Mw (PC) is between 20,000 g/mol and 102,000 g/mol.

In a preferred embodiment the polycarbonate is a homopolymer wherein all repeat units are derived from the first dihydroxy compound. In another preferred embodiment, the polycarbonate may also comprise repeat units derived from one or more dihydroxy compounds that are different from the TBHQ dihydroxy compound. In this embodiment it is preferred that at least 10%, more preferably at least 30%, for example at least 50% or 70%, of the repeat units are derived from the TBHQ "first" dihydroxy compound.

In another preferred embodiment where the polycarbonate is a copolycarbonate the second dihydroxy is BPA. It is preferred that the mole ratio of the TBHQ dihydroxy to the second dihydroxy is in an amount between 90:10 and 10:90, for example between 70:30 and 30:70 or between 60:40 and 40:60.

Method of Making Polycarbonate

In another embodiment the present invention provides a method of producing polycarbonate. The method comprises the steps of:

(A) forming a reaction mixture comprising a diaryl carbonate, a melt transesterification catalyst, and a dihydroxy component comprising a first dihydroxy compound having the structure:

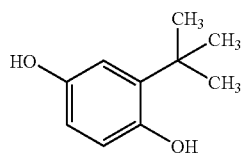

(B) treating the reaction mixture under melt polymerization conditions, and (C) allowing the reaction mixture to react thereby forming polycarbonate, wherein the polycarbonate has a Mw (PC) greater than 9,000, thereby producing polycarbonate.

Melt polymerization reactions that create the transesterification between the free hydroxyl ends of dihydroxy compounds with the carbonate source are known and are not particularly limited with respect to the present invention. For example, U.S. Pat. Nos. 7,482,423 and U.S. Pat. No. 7,498,400 and U.S. patent application Ser. No. 11/863,723 which are incorporated herein by reference for all purposes, disclose preferred processes for the melt production of polycarbonate.

In one preferred embodiment the dihydroxy component, the diaryl carbonate, and the melt transesterification are combined to form a reaction mixture introduced to an oligomerization system. Upon heating, a transesterification reaction occurs to produce a polycarbonate oligomer mixture comprising an equilibrium mixture of oligomeric polycarbonate, by-product phenolic compound, transesterification catalyst, and low levels of the starting materials (dihydroxy component and diaryl carbonate). This is referred to as "equilibrating" the reactants. The "equilibrated" product mixture is then introduced into a plug flow reactor, such as that as described in U.S. patent application Ser. No. 11/863,723 which is incorporated herein by reference for all purposes, also operating under melt polymerization conditions, to effect removal of the by-product ester-substituted phenol while converting the oligomeric polycarbonate into a higher molecular weight product polycarbonate.

In one embodiment the melt transesterification reaction proceeds such that the polycarbonate has a Mw (PC) greater than 10,000 g/mol, more preferably greater than 12,000 g/mol, greater than 15,000 g/mol, greater than 20,000 g/mol, greater than 25,000 g/mol. In specific embodiments, the melt transesterification reaction proceeds such that the polycarbonate has a measured Mw (PC) is between 10,000 g/mol and 160,000 g/mol, for example between 12,000 g/mol and 160,000 g/mol, and preferably between 15,000 and 160,000 g/mol. In another embodiment, the melt transesterification reaction proceeds such that the Mw (PC) is between 20,000 g/mol and 102,000 g/mol.

In a preferred embodiment the polycarbonate prepared is a homopolymer wherein all repeat units are derived from the first dihydroxy compound. In another preferred embodiment, the polycarbonate prepared may also comprise repeat units derived from one or more dihydroxy compounds that are different from the TBHQ dihydroxy compound. In this embodiment the one or more additional dihydroxy compounds may be combined with the other reactants in the reaction mixture. It is preferred that at least 10%, more preferably at least 30%, for example at least 50% or at least 70%, of the repeat units are derived from the TBHQ "first" dihydroxy compound.

In another preferred embodiment where the polycarbonate prepared is a copolycarbonate the second dihydroxy is BPA. It is preferred that the mole ratio of the TBHQ dihydroxy to the second dihydroxy is in an amount between 90:10 and 10:90, for example between 80:20 and 20:80, between 70:30 and 30:70, between 60:40 and 40:60; or 50:50.

The Diaryl Carbonate:

In the melt production of polycarbonate, the compounds which react with the dihydroxy compounds to form carbonate linkages (the carbonate source) may be carbonate diesters, carbonyl halides, etc. Specific examples diaryl carbonates include: diphenylcarbonate, ditolyl carbonate, bis(chlorophenyl) carbonate, m-cresyl carbonate dinaphthyl carbonate, bis(diphenyl)carbonate, diethyl carbonate, dimethyl carbonate, dibutyl carbonate, dicyclohexyl carbonate, and other carbonate diesters, phosgene, and other carbonyl halides. Of the various compounds of this type and wherein the reactor system is cleaned using phenol as the phenolic compound, diphenylcarbonate is often preferred.

The diaryl carbonate can also be derived from an activated diaryl carbonate or a mixture of an activated diaryl carbonate with non-activated diaryl carbonate. A preferred activated carbonate of the present invention is an activated diaryl carbonate such as bismethylsalicylcarbonate (BMSC). However, as used herein the term "activated diaryl carbonate" is defined as a diaryl carbonate which is more reactive than diphenylcarbonate toward transesterification reactions. Such activated diaryl carbonates are of the general formula:

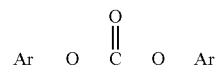

wherein Ar is a substituted aromatic radical having 6 to 30 carbon atoms. The preferred activated diaryl carbonates have the more specific general formula:

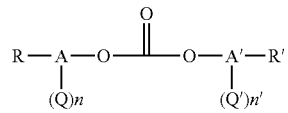

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein a +a' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number if. The number and type of the R and R' substituents on the aromatic ring are not limited unless they deactivate the carbonate and lead to a carbonate which is less reactive than diphenylcarbonate. Typically, the location of the R and R' substituents on the aromatic ring are any one or any combination of the para and/or two ortho positions.

Non-limiting examples of activating groups Q and Q' are: alkoxycarbonyl groups, halogens, nitro groups, amide groups, sulfone groups, sulfoxide groups, imine groups, or cyano groups with structures indicated below:

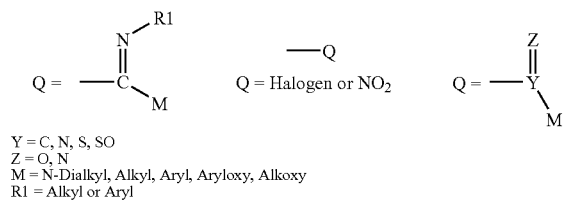

Y = C, N, S, SO
Z = O, N
M = N-Dialkyl, Alkyl, Aryl, Aryloxy, Alkoxy
R1 = Alkyl or Aryl Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate, and bis(o-cyanophenyl) carbonate. Unsymmetrical combinations of these structures, where the substitution number and type on A and A' are different, are also possible to employ in the current invention. A preferred structure for an activated carbonate is an ester-substituted diaryl carbonate having the structure:

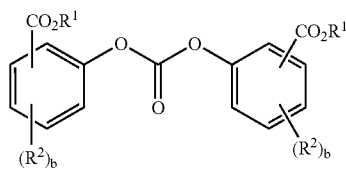

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radial, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer 0-4. At least one of the substituents $CO_2R^1$ is preferably attached in an ortho position relative to the carbonate group.

Examples of preferred ester-substituted diaryl carbonates include but are not limited to bis(methylsalicyl)carbonate (CAS Registry No. 82091-12-1), bis(ethyl salicyl)carbonate, bis(propyl salicyl)carbonate, bis(butylsalicyl)carbonate, bis (benzyl salicyl)carbonate, bis(methyl 4-chlorosalicyl)carbonate and the like. Typically bis(methylsalicyl)carbonate is preferred for use in melt polycarbonate synthesis due to its lower molecular weight and higher vapor pressure.

One method for determining whether a certain diaryl carbonate is activated or is not activated is to carry out a model transesterification reaction between the certain diaryl carbonate with a phenol such as para-cumyl phenol. This phenol is preferred because it possesses only one reactive site, possesses a low of volatility and possesses a similar reactivity to bisphenol-A. The model transesterification reaction was carried out at temperatures above the melting points of the certain diaryl carbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diaryl carbonate. And a preferred reaction temperature is 200 C. But the choice of conditions and catalyst concentration can be adjusted depending on the reactivity of the reactant and melting points of the reactants to provide a convenient reaction rate. The only limitation to reaction temperature is that the temperature must be below the degradation temperature of the reactants. Sealed tubes can be used if the reaction temperatures cause the reactants to volatilize and effect the reactant molar balance. The determination of the equilibrium concentration of reactants is accomplished through reaction sampling during the course of the reaction and then analysis of the reaction mixture using a well-known detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactant and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diaryl carbonate which possesses an equilibrium constant of greater than 1 is considered to possess a more favorable equilibrium than diphenylcarbonate and is an activated carbonate, whereas a diaryl carbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diaryl carbonate.

Some non-limiting examples of non-activating groups which, when present in an ortho position relative to the carbonate group, would not be expected to result in activated carbonates are alkyl and cycloalkyl. Some specific and non-limiting examples of non-activated carbonates are bis(o-methylphenyl)carbonate, bis(p-cumylphenyl)carbonate, and bis(p-(1,1,3,3-tetramethyl)butylphenyl)carbonate. Unsymmetrical combinations of these structures are also expected to result in non-activated carbonates.

Unsymmetrical diaryl carbonates wherein one aryl group is activated and one aryl is unactivated or de-activated would also be useful in this invention if the activating group renders the diaryl carbonate still more reactive than diphenylcarbonate.

The theoretical stoichiometry of the reaction within the melt polymerization reaction mixture requires a molar ratio of dihydroxy composition to diaryl carbonate composition of 1:1. However, in practicing the present invention the molar ratio in the melt reaction mixture is suitably between 0.25:1 to 3:1, more preferably 1:0.95 to 1:1.05 and more preferably 1:0.98 to 1:1.02.

The Dihydroxy Compound:

The polycarbonate of the present invention comprises repeat units derived from a first dihydroxy compound "TBHQ". The polycarbonate may also comprise units derived one or more different dihydroxy compounds. These dihydroxy compounds are not limited to aromatic dihydroxy compounds. However, such dihydroxy aromatic compounds are often preferred. It is also contemplated that the additional dihydroxy compound comprises aliphatic diols and/or acids. The following is a non limiting list of such compounds.

Aliphatic Diols:

Isosorbide: 1,4:3,6-dianhydro-D-sorbitol, Tricyclodecanedimethanol (TCDDM), 4,8-Bis(hydroxymethyl)tricylodecane, Tetramethylcyclobutanediol (TMCBD), 2,2,4,4,-tetramethylcyclobutane-1,3-diol, mixed isomers, cis/trans-1,4-Cyclohexanedimethanol (CHDM), cis/trans-1,4-Bis(hydroxymethyl)cyclohexane, cyclohex-1,4-ylenedimethanol, trans-1,4-Cyclohexanedimethanol (tCHDM), trans-1,4-Bis(hydroxymethyl)cyclohexane, cis-1,4-Cyclohexanedimethanol (cCHDM), cis-1,4-Bis(hydroxymethyl)cyclohexane, cis-1,2,-cyclohexanedimethanol, 1,1'-bi(cyclohexyl)-4,4'-diol, dicyclohexyl-4,4'-diol, 4,4'-dihydroxybicyclohexyl, and Poly(ethylene glycol).

Acids:

1,10-Dodecanedioic acid (DDDA), Adipic acid, Hexanedioic acid, Isophthalic acid, 1,3-Benzenedicarboxylic acid, Terephthalic acid, 1,4-Benzenedicarboxylic acid, 2,6-Naphthalenedicarboxylic acid, 3-hydroxybenzoic acid (mMBA), and 4-hydroxybenzoic acid (pHBA).

It is further contemplated that the additional dihydroxy composition comprises a dihydroxy aromatic compound. A preferred dihydroxy aromatic composition of the present invention is bisphenol A (BPA). However, other dihydroxy aromatic compounds of the present invention can be used and are selected from the group consisting of bisphenols having structure.

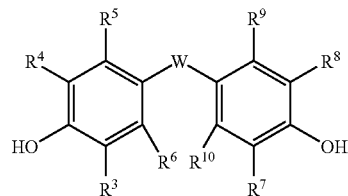

wherein $R^3$-$R^{10}$ are independently a hydrogen atom, halogen atom, nitro group, cyano group, $C_1$-$C_{20}$ alkyl radical, $C_4$-$C_{20}$ cycloalkyl radical, or $C_6$-$C_{20}$ C aryl radical; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical, or the group

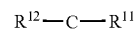

wherein $R^{11}$ and $R^{12}$ are independently a hydrogen atom, $C_1$-$C_{20}$ alkyl radical, $C_4$-$C_{20}$ cycloalkyl radical, or $C_4$-$C_{20}$ aryl radical; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$, aralkyl, $C_5$-$C_{20}$ cycloalkyl groups, or a combination thereof: dihydroxy benzenes having structure

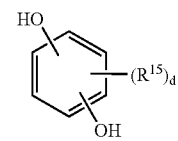

wherein $R^{15}$ is independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical, d is an integer from 0 to 4; and dihydroxy naphthalenes having structures,

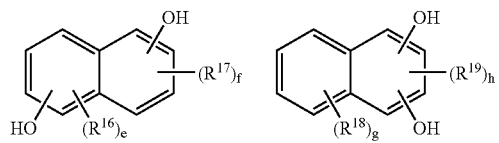

wherein $R^{16}$, $R^{17}$, $R^{18}$ and $R^{19}$ are independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical; e and f are integers from 0 to 3, g is an integer from 0 to 4, and h is an integer from 0 to 2.

Suitable bisphenols are illustrated by 2-phenyl-3,3-bis(4hydroxyphenyl)phthalimide (PPP-BP); 4,4-dihydroxy diphenyl sulphone (BPS); 2,2-bis(4-hydroxyphenyl)propane (bisphenol A);

2,2-bis(3-chloro-4-hydroxyphenyl)propane; 2,2-bis(3-bromo-4-hydroxyphenyl)propane;

2,2-bis(4-hydroxy-3-methylphenyl)propane; 2,2-bis(4-hydroxy-3-isopropylphenyl)propane;

2,2-bis(3-t-butyl-4-hydroxyphenyl)propane; 2,2-bis(3-phenyl-4-hydroxyphenyl)propane;
2,2-bis(3,5-dichloro-4-hydroxyphenyl)-propane; 2,2-bis(3,5-dibromo-4-hydroxyphenyl)propane;
2,2-bis(3,5-dimethyl-4-hydroxyphenyl)propane;
2,2-bis(3-chloro-4-hydroxy-5-methylphenyl)propane;
2,2-bis(3-bromo-4-hydroxy-5-methylphenyl)propane;
2,2-bis(3-chloro-4-hydroxy-5-isopropylphenyl)propane;
2,2-bis(3-bromo-4-hydroxy-5-isopropylphenyl)propane;
2,2-bis(3-t-butyl-5-chloro-4-hydroxyphenyl)propane;
2,2-bis(3-bromo-5-t-butyl-4-hydroxyphenyl)propane;
2,2-bis(3-chloro-5-phenyl-4-hydroxyphenyl)propane;
2,2-bis(3-bromo-5-phenyl-4-hydroxyphenyl)propane;
2,2-bis(3,5-disopropyl-4-hydroxyphenyl)propane;
2,2-bis(3,5-di-t-butyl-4-hydroxyphenyl)propane; 2,2-bis(3,5-diphenyl-4-hydroxyphenyl)propane;
2,2-bis(4-hydroxy-2,3,5,6-tetrachlorophenyl)propane;
2,2-bis(4-hydroxy-2,3,5,6-tetrabromophenyl)propane;
2,2-bis(4-hydroxy-2,3,5,6-tetramethylphenyl)propane;
2,2-bis(2,6-dichloro-3,5-dimethyl-4-hydroxyphenyl)propane;
2,2-bis(2,6-dibromo-3,5-dimethyl-4-hydroxyphenyl)propane;
1,1-bis(4-hydroxyphenyl)cyclohexane; 1,1-bis(3-chloro-4-hydroxyphenyl)cyclohexane;
1,1-bis(3-bromo-4-hydroxyphenyl)cyclohexane; 1,1-bis(4-hydroxy-3-methylphenyl)cyclohexane;
1,1-bis(4-hydroxy-3-isopropylphenyl)cyclohexane;
1,1-bis(3-t-butyl-4-hydroxyphenyl)cyclohexane; 1,1-bis(3-phenyl-4-hydroxyphenyl)cyclohexane;
1,1-bis(3,5-dichloro-4-hydroxyphenyl)cyclohexane;
1,1-bis(3,5-dibromo-4-hydroxyphenyl)cyclohexane;
1,1-bis(3,5-dimethyl-4-hydroxyphenyl)cyclohexane;
1,1-bis(3-chloro-4-hydroxy-5-methylphenyl)cyclohexane;
1,1-bis(3-bromo-4-hydroxy-5-methylphenyl)cyclohexane;
1,1-bis(3-chloro-4-hydroxy-5-isopropylphenyl)cyclohexane;
1,1-bis(3-bromo-4-hydroxy-5-isopropylphenyl)cyclohexane;
1,1-bis(3-t-butyl-5-chloro-4-hydroxyphenyl)cyclohexane;
1,1-bis(3-bromo-5-t-butyl-4-hydroxyphenyl)cyclohexane;
1,1-bis(3-chloro-5-phenyl-4-hydroxyphenyl)cyclohexane;
1,1-bis(3-bromo-5-phenyl-4-hydroxyphenyl)cyclohexane;
1,1-bis(3,5-disopropyl-4-hydroxyphenyl)cyclohexane;
1,1-bis(3,5-di-t-butyl-4-hydroxyphenyl)cyclohexane;
1,1-bis(3,5-diphenyl-4-hydroxyphenyl)cyclohexane;
1,1-bis(4-hydroxy-2,3,5,6-tetrachlorophenyl)cyclohexane;
1,1-bis(4-hydroxy-2,3,5,6-tetrabromophenyl)cyclohexane;
1,1-bis(4-hydroxy-2,3,5,6-tetramethylphenyl)cyclohexane;
1,1-bis(2,6-dichloro-3,5-dimethyl-4-hydroxyphenyl)cyclohexane;
1,1-bis(2,6-dibromo-3,5-dimethyl-4-hydroxyphenyl)cyclohexane;
1,1-bis(4-hydroxyphenyl)-3,3,5-trimethylcyclohexane;
1,1-bis(3-chloro-4-hydroxypheny)-3,3,5-trimethylcyclohexane;
1,1-bis(3-bromo-4-hydroxyphenyl)-3,3,5-trimethylcyclohexane;
1,1-bis(4-hydroxy-3-methylphenyl)-3,3,5-trimethylcyclohexane;
1,1-bis(4-hydroxy-3-isopropylphenyl)-3,3,5-trimethylcyclohexane;
1,1-bis(3-t-butyl-4-hydroxyphenyl)-3,3,5-trimethylcyclohexane;
1,1-bis(3-phenyl-4-hydroxyphenyl)-3,3,5-trimethylcyclohexane;
1,1-bis(3,5-dichloro-4-hydroxyphenyl)-3,3,5-trimethylcyclohexane;
1,1-bis(3,5-dibromo-4-hydroxyphenyl)-3,3,5-trimethylcyclohexane;
1,1-bis(3,5-dimethyl-4-hydroxyphenyl-3,3,5-trimethylcyclohexane;
1,1-bis(3-chloro-4-hydroxy-5-methylphenyl)-3,3,5-trimethylcyclohexane;
1,1-bis(3-bromo-4-hydroxy-5-methylphenyl)-3,3,5-trimethylcyclohexane;
1,1-bis(3-chloro-4-hydroxy-5-isopropylphenyl)-3,3,5-trimethylcyclohexane;
1,1-bis(3-bromo-4-hydroxy-5-isopropylphenyl)-3,3,5-trimethylcyclohexane;
1,1-bis(3-t-butyl-5-chloro-4-hydroxyphenyl)-3,3,5-trimethylcyclohexane;
1,1-bis(3-bromo-5-t-butyl-4-hydroxyphenyl)-3,3,5-trimethylcyclohexane;
bis(3-chloro-5-phenyl-4-hydroxyphenyl)-3,3,5-trimethylcyclohexane;
1,1-bis(3-bromo-5-pheynl-4-hydroxyphenyl)-3,3,5-trimethylcyclohexame;
1,1-bis(3,5-disopropyl-4-hydroxyphenyl)-3,3,5-trimethylcyclohexane;
1,1-bis(3,5-di-t-butyl-4-hydroxyphenyl)-3,3,5-trimethylcyclohexane;
1,1-bis(3,5-diphenyl-4-hydroxyphenyl)-3,3,5-trimethylcyclohexane;
1,1-bis(4-hydroxy-2,3,5,6-tetrachlorophenyl)-3,3,5-trimethylcyclohexane;
1,1-bis(4-hydroxy-2,3,5,6-tetrabromophenyl)-3,3,5-trimethylcyclohexane;
1,1-bis(4-hydroxy-2,3,5,6-tetramethylphenyl)-3,3,5-trimethylcyclohexane;
1,1-bis(2,6-dichloro-3,5-dimethyl-4-hydroxyphenyl)-3,3,5-trimethylcyclohexane;
1,1-bis(2,6-dibromo-3,5-dimethyl-4-hydroxyphenyl)-3,3,5-trimethylcyclohexane;
4,4'dihydroxy-1,1-biphenyl; 4,4'-dihydroxy-3,3'-dimethyl-1,1-biphenyl;
4,4'-dihydroxy-3,3'-dioctyl-1,1-biphenyl; 4,4'-dihydroxydiphenylether;
4,4'-dihydroxydiphenylthioether; 1,3-bis(2-(4-hydroxyphenyl)-2-propyl)benzene;
1,3-bis(2-(4-hydroxy-3-methylphenyl)-2-propyl)benzene;
1,4-bis(2-(4-hydroxyphenyl)-2-propyl)benzene, and
1,4-bis(2-(4-hydroxy-3-methylphenyl)-2-propyl)benzene.

Suitable dihydroxy benzenes are illustrated by hydroquinone, resorcinol, methylhydroquinone, butylhydroquinone, phenylhydroquinone, 4-phenylresorcinol and 4-methylresorcinol.

Suitable dihydroxy naphthalenes are illustrated by 2,6-dihydroxy naphthalene; 2,6-dihydroxy-3-methyl naphthalene; 2,6-dihydroxy-3-phenyl naphthalene; 1,4-dihydroxy naphthalene; 1,4-dihydroxy-2-methyl naphthalene; 1,4-dihydroxy-2-phenyl naphthalene and 1,3-dihydroxy naphthalene.

The type and relative amounts of TBHQ and other comonomers are selected based on the desired composition of the oligomers. However, BPA is often preferred.

The Transesterification Catalyst:

In one embodiment the invention provides a method of producing polycarbonate. In another embodiment a catalyst (or catalyst system) will be added to the dihydroxy component and the diaryl carbonate thereby forming a melt reaction mixture that is introduced to the melt polymerization system to build molecular weight of the polycarbonate. The catalyst system used in this method of the present invention comprises a base, and preferably comprises at least one source of alkaline earth ions or alkali metal ions, and/or at least one quaternary ammonium compound, a quaternary phosphonium compound or a mixture thereof. The source of alkaline earth ions or alkali metal ions being used in an amount such that the amount of alkaline earth or alkali metal ions present in the reaction mixture is in a range between $10^{-5}$ and $10^{-8}$ moles alkaline earth or alkali metal ion per mole of dihydroxy compound employed.

The quaternary ammonium compound is selected from the group of organic ammonium compounds having structure,

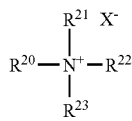

wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is selected from the group consisting of hydroxide, halid, carboxylate, sulfonate, sulfate, formate, carbonate, and bicarbonate.

Non-limiting examples of suitable organic quaternary ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure,

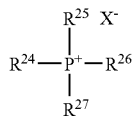

wherein $R^{24}$-$R^{27}$ are independently a $C^1$-$C^{20}$ alkyl radical, $C^4$-$C^{20}$ cycloalkyl radical, or a $C_4$-$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic quaternary phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents $\frac{1}{2}(CO_3^{-2})$.

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred. Further sodium hydroxide is often contained within the reaction components as an impurity and is contained in such an amount to catalyze the reaction without the addition of additional catalysts.

In order lo achieve the formation of polycarbonate using the method of the present invention an effective amount of catalyst must be employed. The amount of catalyst employed is typically based upon the total number of moles of dihydroxy compounds employed in the polymerization reaction. When referring to the ratio of catalyst, for example phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts employed typically will be in a range between $1\times10^{-2}$ and $1\times10^{-6}$, preferably between $1\times10^{-4}$ and $1\times10^{-5}$ moles per mole of the first and second dihydroxy compounds combined. The inorganic metal hydroxide catalyst typically will be used in an amount corresponding to between $1\times10^{-4}$ and $1\times10^{-8}$, preferably $1\times10^{-4}$ and $1\times10^{-7}$ moles of metal hydroxide per mole of the first and second dihydroxy compounds combined.

In a third catalyst system according to the method of the present invention, solely a alkali metal hydroxide may be employed. As discussed above, alkali metal hydroxides are illustrated by sodium hydroxide, lithium hydroxide, and potassium hydroxide. Due to its relatively low cost, sodium hydroxide is often preferred.

Blends of polymers are typical in industry. Thus the polycarbonate of the present invention may be blended with other polymeric materials, for example, other polycarbonates, polyestercarbonates, polyesters and olefin polymers such as ABS. Further, the polycarbonates of the present invention may be blended with conventional additives such as reinforcing agents, thermal stabilizers, radiation stabilizers, antioxidants, light stabilizers, UV stabilizers, plasticizers, visual effect enhancers, extenders, antistatic agents, catalyst quenchers, mold release agents, flame retardants, infrared shielding agents, whitening agents, blowing agents, anti-drip agents, impact modifiers and processing aids. These blends or polycarbonate of the present invention itself may be molded into various articles such as optical disks, optical lenses, automobile lamp components and the like. Thus, it is an aspect of the present invention to provide molded articles comprising the blends of polycarbonate and/or the polycarbonate of the present invention.

EXAMPLES

Having described the invention in detail, the following examples are provided. The examples should not be considered as limiting the scope of the invention, but merely as illustrative and representative thereof.

(WE) as used herein is understood to mean "working example" while (CE) is understood to mean "comparative example". The terms "working" and "comparative" are simply used to demonstrate comparisons to other examples. A comparative example may or may not be an example within the scope of the present invention.

Examples 1-12

Examples 1-12 (provided in Table 1) are provided to demonstrate that polycarbonates comprising repeat units derived from TBHQ dihydroxy have superior properties as compared to polycarbonate not containing repeat units derived from TBHQ dihydroxy. Unlike other quinone-type monomers. TBHQ will not cause crystallization, even at high loadings, even up to 100%. See Table 1 and FIG. 1.

Also included in Table 1 is a comparison of TBHQ polycarbonate to BPA homopolycarbonate (Example 1). Although BPA homopolycarbonate is normally considered an amorphous polymer (i.e. no melting point of the polymerized resin), it can be crystallized as seen in the results of solvent cast films. On the other hand, TBHQ polycarbonate (Example 2) cannot be crystallized even when cast from a solvent.

Solvent cast films were prepared by the following process. 1 gram of a polymer was dissolved in 20 ml methylene chloride. After the polymer is completely dissolved the solution is poured out in a Petri dish with a diameter of 10 cm. The petridish is covered with aluminum foil prepared with some small holes to allow the methylene chloride to evaporate slowly (at room temperature in a fumehood). After 24 hours the methylene chloride is evaporated and a solid film can be pulled from the Petri dish.

Molecular weight: Mw and Mn were measured by GPC analysis of 1 mg/ml polymer solutions in methylene chloride versus polystyrene (PS) standards. It is noted that the Mw (PS) value is approximately equal to twice the Mw (PC).

Examples 13-50

Figure 2:
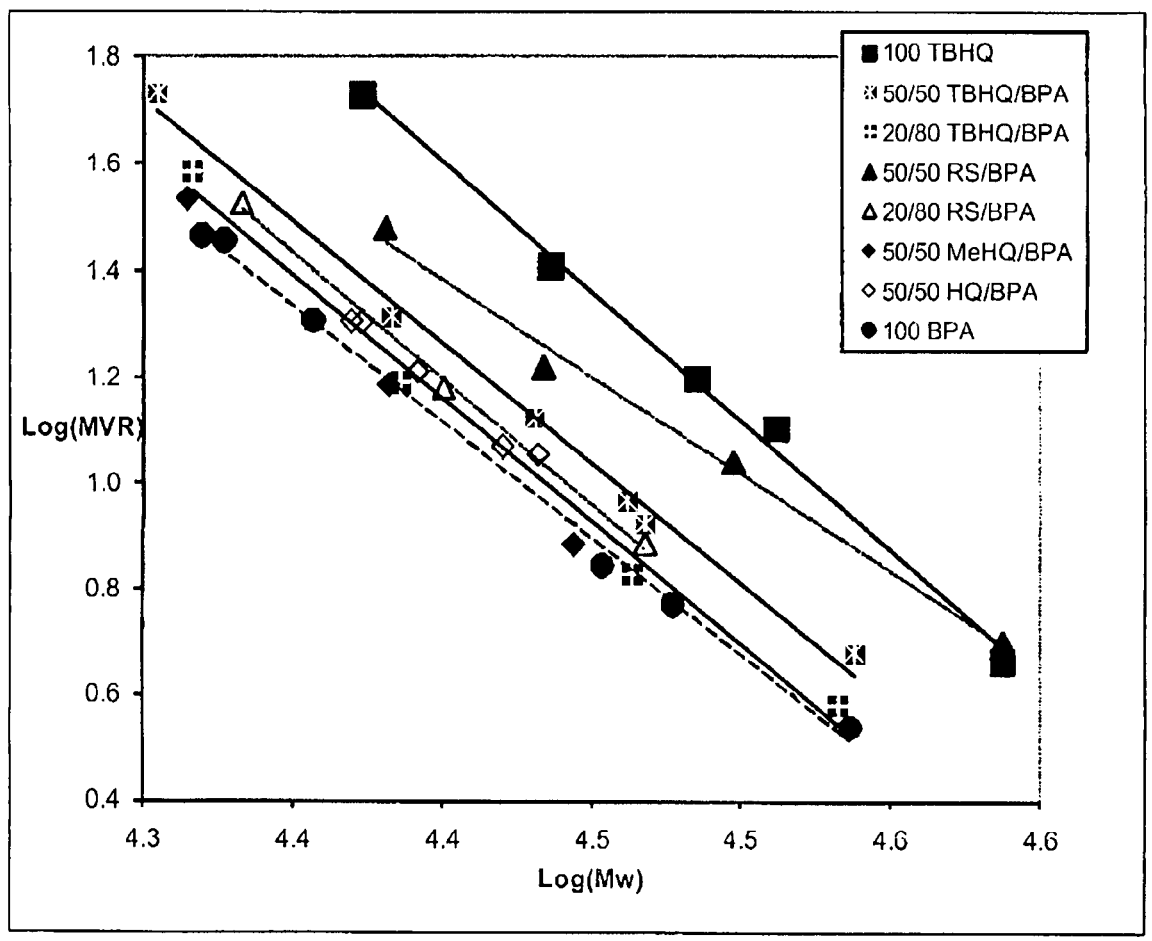
FIG. 2 is a graph of viscosity compared to molecular weight of examples from the example section.
Figure 3:
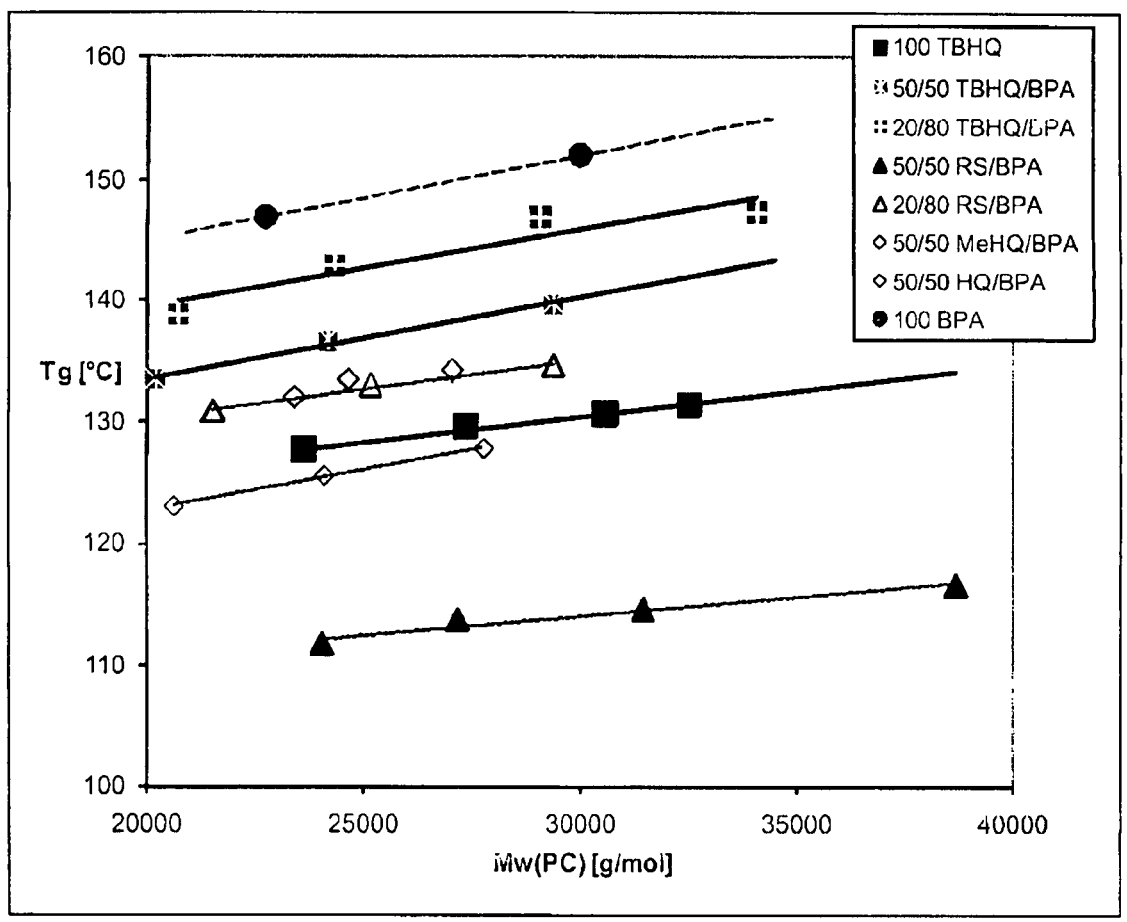
FIG. 3 is a graph of Tg (°C) compared to molecular weight of examples from the example section.

TBHQ also gives improved melt flow (as measured by MVR) with minimal reduction in heat performance (as measured by Tg). By comparison, other quinone-type monomers do not offer both advantages. RS is known to improve melt flow, but at a cost of lowering Tg. MeHQ, does not significantly improve melt flow, yet still lowers Tg. HQ improves melt flow and lowers Tg slightly. Table 2 shows Mw, MVR and Tg data. The MVR versus Mw data is plotted in a Log-Log form in FIG. 2. In FIG. 3 Tg is plotted versus Mw.

Figure 4:
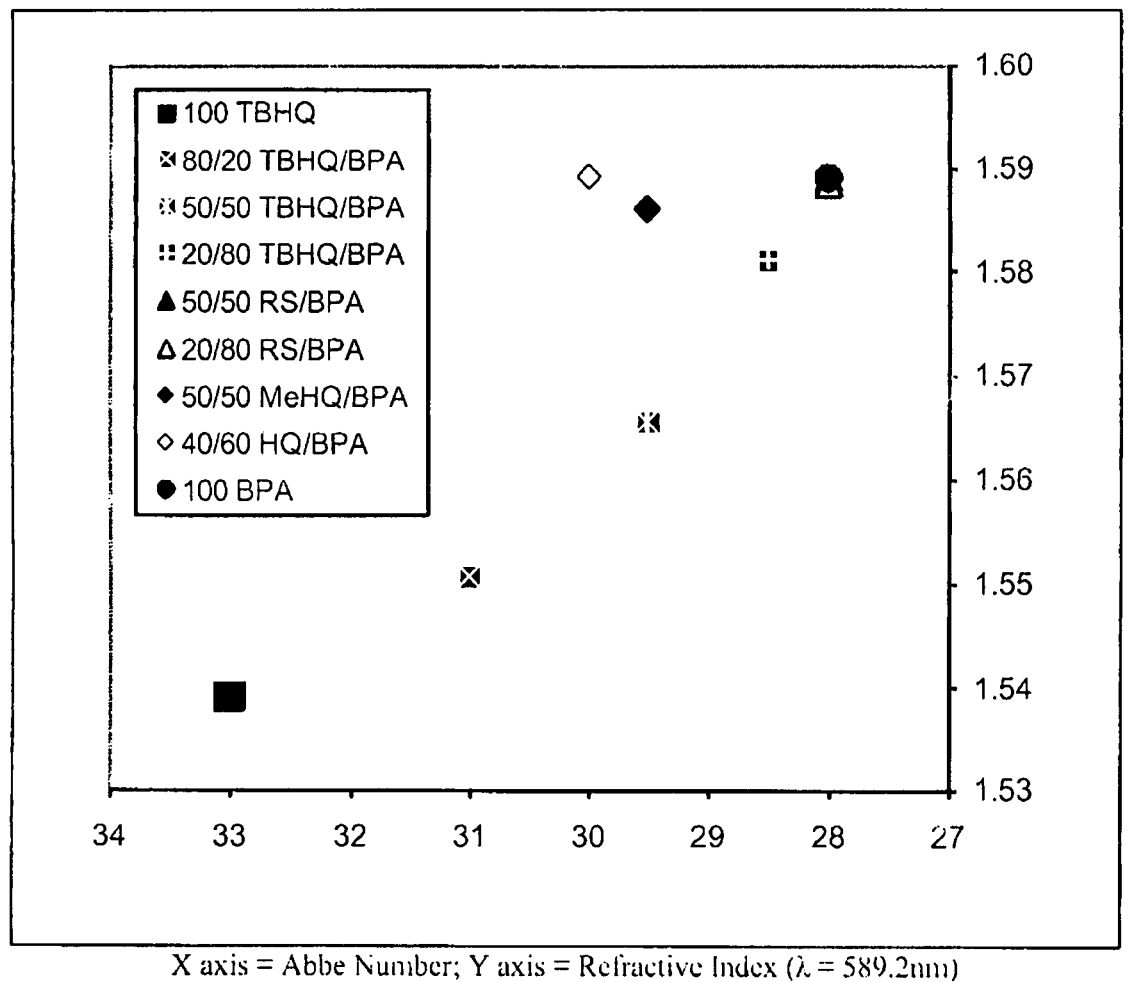
FIG. 4 is a graph of Refractive Index compared to Abbe Number of examples from the example section.

The refractive indices measured at 589.2 nm (nD) and the Abbe numbers for the working and comparative examples are given in Table 1 and also plotted in FIG. 4. It is herein demonstrated that TBHQ dihydroxy significantly lowers and R1 and increases the Abbe number, while the other comonomers do not.

Mw was determined via GPC using polycarbonate standards relative to polycarbonate. Melting points and Tg's were determined via DSC according to standard ISO 11357. MVRs were determined at 300° C. and 1.2 kg according to standard ISO 1133. Solvent cast films were made by dissolving 1 g of polymer in 20 mL of dichloromethane and casting the solution into Petri dishes and then allowing the solvent to evaporate at room temperature. The refractive index and the Abbe number of the polymers were measured using a J. A. Woollam spectroscopic ellipsometer (M-2000®) on spun-cast films. Abbe number is defined as:

TABLE 1

(Examples 1-12) Properties

| Ex | Working or Comparative | Composition | Mw(PS) | Appearance of As-Polymerized Resin | Melting Point of As-Polymerized Resin | Appearance of Solvent Cast Film | Melting Point of Cast Film |
|---|---|---|---|---|---|---|---|
| 1 | CE | 100 BPA | 44300 | clear/transparent | none | opaque | 232° C. |
| 2 | WE | 100 TBHQ | 43822 | clear/transparent | none | clear/transparent | none |
| 3 | WE | 80/20 TBHQ/BPA | 45220 | clear/transparent | none | Not Measured | Not Measured |
| 4 | WE | 50/50 TBHQ/BPA | 34289 | clear/transparent | none | Not Measured | Not Measured |
| 5 | WE | 20/80 TBHQ/BPA | 44946 | clear/transparent | none | Not Measured | Not Measured |
| 6 | CE | 65/35 HQ/BPA | not soluble | transluscent | 342° C. | Not Measured | Not Measured |
| 7 | CE | 50/50 HQ/BPA | 46406 | clear/transparent | none | Not Measured | Not Measured |
| 8 | CE | 90/10 MeHQ/BPA | not soluble | clear/transparent | 258° C. | Not Measured | Not Measured |
| 9 | CE | 80/20 MeHQ/BPA | 45941 | clear/transparent | none | Not Measured | Not Measured |
| 10 | CE | 100% DTBHQ | not soluble | opaque | >350° C. degrades upon melting | Not Measured | Not Measured |
| 11 | CE | 80/20 DTBHQ/BPA | not soluble | opaque | >350° C. degrades upon melting | Not Measured | Not Measured |
| 12 | CE | 70/30 DTBHQ/BPA | not soluble | clear/transparent | none | Not Measured | Not Measured |

$$V = \frac{n_D - 1}{n_F - n_C}$$

where $n_D$, $n_F$ and $n_C$ are the refractive indices of the material at the wavelengths of the Fraunhofer D-, F- and C-spectral lines (589.2 nm, 486.1 nm and 656.3 nm, respectively).

TABLE 2

Example 13-48 (properties)

| Example | Working or Comparitive | Composition | Mw(PC) | MVR | Tg | Log(MwPC) | Log(MVR) |
|---|---|---|---|---|---|---|---|
| 13 | WE | 100 TBHQ | 32504 | 12.7 | 131.5 | 4.5119 | 1.1021 |
| 14 | WE | 100 TBHQ | 30585 | 15.8 | 130.6 | 4.4855 | 1.1982 |
| 15 | WE | 100 TBHQ | 27334 | 25.5 | 129.6 | 4.4367 | 1.4063 |
| 16 | WE | 100 TBHQ | 23629 | 53.4 | 127.6 | 4.3734 | 1.7273 |
| 17 | WE | 100 TBHQ | 38647 | 4.6 |  | 4.5871 | 0.6594 |
| 18 | WE | 50/50 TBHQ/BPA | 34504 | 4.8 |  | 4.5379 | 0.6781 |
| 19 | WE | 50/50 TBHQ/BPA | 28965 | 9.2 |  | 4.4619 | 0.9650 |
| 20 | WE | 50/50 TBHQ/BPA | 26977 | 13.2 |  | 4.4310 | 1.1207 |
| 21 | WE | 50/50 TBHQ/BPA | 29371 | 8.3 | 139.8 | 4.4679 | 0.9204 |
| 22 | WE | 50/50 TBHQ/BPA | 24154 | 20.6 | 136.7 | 4.3830 | 1.3141 |
| 23 | WE | 50/50 TBHQ/BPA | 20182 | 54.0 | 133.5 | 4.3050 | 1.7326 |
| 24 | WE | 20/80 TBHQ/BPA | 34073 | 3.8 | 147.4 | 4.5324 | 0.5804 |
| 25 | WE | 20/80 TBHQ/BPA | 29068 | 6.7 | 147.0 | 4.4634 | 0.8261 |
| 26 | WE | 20/80 TBHQ/BPA | 24313 | 15.5 | 143.0 | 4.3858 | 1.1898 |
| 27 | WE | 20/80 TBHQ/BPA | 20722 | 38.5 | 138.9 | 4.3164 | 1.5850 |
| 28 | CE | 50/50 RS/BPA | 24040 | 30.1 | 111.7 | 4.3809 | 1.4789 |
| 29 | CE | 50/50 RS/BPA | 27168 | 16.5 | 113.7 | 4.4341 | 1.2174 |
| 30 | CE | 50/50 RS/BPA | 31452 | 10.9 | 114.6 | 4.4976 | 1.0376 |
| 31 | CE | 50/50 RS/BPA | 38678 | 5.0 | 116.6 | 4.5875 | 0.6977 |
| 32 | CE | 20/80 RS/BPA | 29368 | 7.6 | 134.7 | 4.4679 | 0.8828 |
| 33 | CE | 20/80 RS/BPA | 25137 | 15.1 | 133.0 | 4.4003 | 1.1785 |
| 34 | CE | 20/80 RS/BPA | 21522 | 33.4 | 130.8 | 4.3329 | 1.5241 |
| 35 | CE | 50/50 MeHQ/BPA | 27787 | 7.6 | 127.8 | 4.4438 | 0.8811 |
| 36 | CE | 50/50 MeHQ/BPA | 24092 | 15.3 | 125.5 | 4.3819 | 1.1848 |
| 37 | CE | 50/50 MeHQ/BPA | 20646 | 34.1 | 123.0 | 4.3148 | 1.5325 |
| 38 | CE | 100 BPA | 34411 | 3.5 |  | 4.5367 | 0.5378 |
| 39 | CE | 100 BPA | 30017 | 5.9 | 152.0 | 4.4774 | 0.7672 |
| 40 | CE | 100 BPA | 22751 | 20.3 | 146.9 | 4.3570 | 1.3064 |
| 41 | CE | 100 BPA | 20886 | 29.1 |  | 4.3199 | 1.4639 |
| 42 | CE | 100 BPA | 28424 | 7.0 |  | 4.4537 | 0.8420 |
| 43 | CE | 100 BPA | 21251 | 28.6 |  | 4.3274 | 1.4556 |
| 44 | CE | 50/50 HQ/BPA | 23419 | 20.2 | 132.0 | 4.3696 | 1.3043 |
| 45 | CE | 50/50 HQ/BPA | 23615 | 20.1 |  | 4.3732 | 1.3021 |
| 46 | CE | 50/50 HQ/BPA | 26329 | 11.7 |  | 4.4204 | 1.0667 |
| 47 | CE | 50/50 HQ/BPA | 27049 | 11.3 | 134.2 | 4.4322 | 1.0529 |
| 48 | CE | 50/50 HQ/BPA | 24638 | 16.2 | 133.5 | 4.3916 | 1.2099 |

TABLE 3

(Examples Cont. & Examples 49-50)

| Example | Working or Comparitive | Composition | RI @ 589.2 nm | Abbe Number |
|---|---|---|---|---|
| 14 | WE | 100 TBHQ | 1.539 | 33.0 |
| 49 | WE | 80/20 TBHQ/BPA | 1.551 | 31.0 |
| 22 | WE | 50/50 TBHQ/BPA | 1.566 | 29.5 |
| 25 | WE | 20/80 TBHQ/BPA | 1.581 | 28.5 |
| 29 | CE | 50/50 RS/BPA | 1.589 | 28.0 |
| 32 | CE | 20/80 RS/BPA | 1.589 | 28.0 |
| 35 | CE | 50/50 MeHQ/BPA | 1.586 | 29.5 |
| 43 | CE | 100 BPA | 1.589 | 28.0 |
| 50 | CE | 40/60 HQ/BPA | 1.589 | 30.0 |

Example 51

Interfacial Polymerization

Previous experiments by Brunelle et al. (described above) were repeated to check if high molecular weigh TBHQ-BPA copolymers could be synthesized interfacially according to the referenced method. The referenced method was slightly modified with an improved method for forming bischloroformates by the interfacial process using a phase-transfer catalyst.

The following were added into a 2 L, 5 necked Morton flask, equipped with an overhead condenser, and overhead stirrer, a pH probe, a caustic solution inlet, and a phosgene inlet: (a) 4,4-bis-(hydroxyphenyl)-2,2-propane (BPA) (10 g, 0.044 mol); (b) tert-butyl hydroquinone (TBHQ) (10 g, 0.060 mol); (c) methyl-tributylammonium chloride (MTBAC) (0.1 mL); (d) methylene chloride (300 mL); and (e) de-ionized water (100 mL). The mixture was charged with phosgene (21.6 g, 2 g/min, 0.22 mol). During the addition of phosgene, base (50 wt % NaOH in deionized water) was simultaneously charged to the reactor to maintain the pH of the reaction between 6-8. After the complete addition of phosgene, the reaction was purged with nitrogen gas, the organic layer was tested for chloroformates with phosgene paper (strong chloroformates were present) and 150 grams of the organic layer (BCF solution) was extracted into a pre-tared glass container.

After the reactor had been thoroughly cleaned, the following were added into the same reactor described above: (a) methylene chloride (172 mL); (b) 1.0 grams of triethylamine; (c) and 0.6 grams of 50% aqueous NaOH. Then, the BCF solution was added over a 30 minute period, and simultaneously, 11.8 grams of 50% aqueous NaOH solution to maintain the pH 10-11. Also, 0.9 grams of triethylamine was added over the 30 minute period. After the complete addition of the BCF solution, the organic layer was washed with aqueous HCl and the molecular weight (PC) was measured by GPC. As with the Brunelle experiments, there was some insoluble polymer precipitate during the latter stages in the reaction.

Example 52

Interfacial Polymerization

The following were added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (6.2 g, 0.027 mol); (b) tert-butyl hydroquinone (TBHQ) (13.8 g, 0.083 mol); (c) methyl-tributylammonium chloride (MT-BAC) (0.1 mL); (d) methylene chloride (300 mL); and (e) de-ionized water (100 mL). The mixture was charged with phosgene (21.6 g, 2 g/min, 0.22 mol). During the addition of phosgene, base (50 wt % NaOH in deionized water) was simultaneously charged to the reactor to maintain the pH of the reaction between 6-8. After the complete addition of phosgene, the reaction was purged with nitrogen gas, the organic layer was tested for chloroformates with phosgene paper (strong chloroformates were present) and 150 grams of the organic layer (BCF solution) was extracted into a pre-tared glass container. After the reactor had been thoroughly cleaned, the following were added into the same reactor described above: (a) methylene chloride (183 mL); (b) 1.1 grams of triethylamine; (c) and 0.7 grams of 50% aqueous NaOH. Then, the BCF solution was added over a 30 minute period, and simultaneously, 12.5 grams of 50% aqueous NaOH solution to maintain the pH 10-11. Also, 0.9 grams of triethylamine was added over the 30 minute period. After the complete addition of the BCF solution, the organic layer was washed with aqueous HCl and the molecular weight was measured by GPC (PC reference standards). As with the Brunelle experiments, there was some insoluble polymer precipitate during the latter stages in the reaction.

Examples 51 and 52 (see Table 4) show that linear, low molecular weight oligomers were formed. Thus, the interfacial method can not be used to produce high molecular weight polymer (Mw>9,000 g/mol for example greater than 10,000 or 15,000 g/mol) even though there was no chain terminator used in the experiments. The interfacial method produces materials that do crystallize as shown in Table 4 (i.e. the polymer measured, Example 52, had a melting point).

TABLE 4

| Example | Working or Comparitive | Composition | Mw (PC) | PDI (PC) | Tm (DSC) |
|---|---|---|---|---|---|
| 51 | CE | 58/42 TBHQ/BPA | 8447 | 3.7 | not measured |
| 52 | CE | 75/25 TBHQ/BPA | 8695 | 2.3 | 110 |

Example 53

Melt Polymerization

A 100% TBHQ polycarbonate was synthesized using a non-activated diaryl carbonate DPC (rather than an activated diaryl carbonate BMSC). A batch tube glass reactor was charged with t-Butyl Hydroquinone (14.3691 g, 0.086 mole) and diphenylcarbonate (20.00 g, 0.093 mole). The system was vacuumized several times in order to create an oxygen free atmosphere. 100 microliter of a catalyst solution containing NaOH ($4.375 \times 10^{-7}$ mole) and tetramethylammonium hydroxide ($2.16 \times 10^{-5}$ mole) was injected into the powder, while preventing any oxygen from entering into the reactor tube. The reactor was electrically heated at 180° C. at atmospheric pressure in a nitrogen atmosphere in order to melt the ingredients (10 minutes). The polymerization was started by raising the reactor temperature to 230° C. and carefully applying a pressure of 170 mbar. After 1 hour the temperature was further increased to 270° C., while pressure was decreased to 20 mbar and the reaction mixture was allowed to react for 30 minutes under these conditions. Finally the settings were changed to 300° C. and full vacuum in order to build molecular weight. After 30 minutes vacuum was released and the polymer was stranded. This yielded a brownish transparent polymer with Mw (PS)-44210. No melting point was found in DSC.

Example 54

Melt Polymerization with TBHQ using DPC

A 20% TBHQ copolymer with BPA was prepared by melt transesterification reaction, carried out in a 25 gram scale batch reactor. To remove any sodium from the glass the reactor was soaked in 1M HCl for at least 24 hours followed by rinsing at least 5 times with 18.2 M ohm. The temperature of the reactor was maintained using a heating mantle with a PID controller. The pressure over the reactor was controlled by a nitrogen bleed into a vacuum pump downstream of the distillate collection flasks and measured with a pressure gauge. Catalyst solutions where prepared by diluting tetramethylammonium hydroxide (TMAH) (Sachem, 25% in water) and NaOH (Acros, 0.5 mol/l) to the proper concentrations with 18.2 M ohm water. Reactions were carried out in the presence of $2.5 \times 10^{-4}$ mole of TMAH/mol diol, which was added in 100 microliter together with the $2.5 \times 10^{-6}$ mole of NaOH/mol diol. The total amount of catalyst solution added is maintained at 100 microliter. The glass reactor tube was charged with the solid BPA (0.08645 mol), solid TBHQ (0.02161 mol) and solid DPC (0.1167 mol), targeted molar ratio 1.08 (carbonate/sum of dihydroxy compounds). The reactor was then assembled, sealed and the atmosphere was exchanged with nitrogen three times. The catalyst was added to the monomers. The reactor was brought to near atmospheric pressure. During polymerization the overhead of the reactor system is maintained at 100° C. The following temperature/pressure profile was used.

Melting: 180° C., 1000 mbar, (stirring is started after 6 minutes), 10 minutes
Step 1; 230° C., 170 mbar, 60 minutes
Step 2; 270° C., 20 mbar, 30 minutes
Step 3; 300° C., full vacuum (~0.5 mbar), 30

After completion of the polymerization, the reactor is brought back to atmospheric pressure with a gentle nitrogen flow. When atmospheric pressure is reached, the stirrers are stopped and the produced material is drained from the reactor tubes by opening the reactors at the bottom and pushing out the material with a slight nitrogen over-pressure. The harvested material is then used for analysis. The reaction yielded in a slightly yellow, transparent polymer with molecular weight of 35 kg/mol (PS), Pd of 2.50.

Example 55

Melt Polymerization with TBHQ using BMSC

An 80/20 (mol/mol) polycarbonate copolymer of tert-butyl hydroquinone and BPA was made via the BMSC/melt reactive extrusion process. The samples were synthesized as follows. A stainless steel stirred tank reactor was charged with 6100 g BPA, 17767 g TBHQ, and 44971 g BMSC to give a molar ratio of [carbonate]/[diol] equal to about 1.017. Also added to the reactor was an aqueous catalyst solution of tetramethylammonium hydroxide (TMAH) and sodium hydroxide (NaOH) in an amount corresponding to $5.0 \times 10^{-5}$ moles TMAH and $4.0 \times 10^{-6}$ moles of NaOH per total number of moles of BPA/TBHQ. The reactor was then evacuated and purged with nitrogen three times to remove residual oxygen and then held at a constant vacuum pressure of 800 mbar. The reactor was then heated to 170° C. in order to melt and react the mixture. After approximately 4 hr 15 min from the start of heating (of the reactor tank), the reactor was pressurized with nitrogen to a constant overpressure of 0.9 bar, and the molten reaction mixture was fed through a 170° C. heat feed-line into an extruder at a rate of about 10 kg/h. 15 minutes before starting the feed to the extruder an aqueous catalyst solution of sodium hydroxide (NaOH) in an amount corresponding to $17.0 \times 10^{-6}$ moles of NaOH per total number of moles of BPA/TBHQ. The extruder is a W&P ZSK25WLE 25 mm 13-barrel twin-screw extruder with an L/D-59. The feed into the extruder comprised a flash-valve to prevent boiling of the molten mixture. The reaction mixture was reactively extruded at a screw speed of 300 rpm. The extruder was equipped with five forward vacuum vents and one back-vent. The methyl salicylate byproduct is removed via devolatilization through these vents. The vacuum pressure of the back-vent was 11 mbar. The vacuum pressure of the first forward vent was 3 mbar. The vacuum pressure of the final four forward vents was less than 1 mbar. This TBHQ/BPA (80/20) copolymer has been made with all the extruder barrels at a temperature of 270° C. and the extruder die head at a temperature of 280° C. The polymer prepared had the following properties: Mw=37351; Mn=17019; and polydispersity=2.19.

The invention claimed is:

1. A polycarbonate comprising repeat units derived from a first dihydroxy compound having the structure:

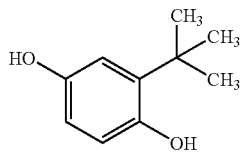

wherein the polycarbonate is amorphous and has a Mw (PC) of at least 9,000 g/mol and wherein the polycarbonate comprises at least 20 mol % repeat units derived from the first dihydroxy compound.

2. The polycarbonate of claim 1, wherein the polycarbonate has a Mw (PC) of at least 10,000 g/mol.

3. The polycarbonate of claim 1, wherein the polycarbonate has a Mw (PC) of at least 15,000 g/mol.

4. The polycarbonate of claim 1, wherein the polycarbonate further comprises repeat units derived from a second dihydroxy compound.

5. The polycarbonate of claim 4, wherein the second dihydroxy is BPA.

6. The polycarbonate of claim 4, wherein the mole ratio of the first Dihydroxy to the second dihydroxy is in an amount between 70:30 and 30:70.

7. The polycarbonate of claim 6, wherein the mole ratio of the first dihydroxy to the second dihydroxy is in an amount between 60:40 and 40:60.

8. The polycarbonate of claim 1, wherein at least 30% of the repeat units are derived from the first dihydroxy compound.

9. The polycarbonate of claim 8, wherein at least 50% of the repeat units are derived from the first dihydroxy compound.

10. The polycarbonate of claim 9, wherein at least 70% of the repeat units are derived from the first dihydroxy compound.

11. The polycarbonate of claim 1, wherein all repeat units are derived from the first dihydroxy compound.

12. A molded article formed from the polycarbonate of claim 1.

13. A method of forming polycarbonate comprising the steps of:
  (A) forming a reaction mixture comprising a diaryl carbonate, a melt transesterification catalyst, and a dihydroxy component comprising a first dihydroxy compound having the structure:

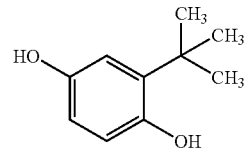

(B) treating the reaction mixture under melt polymerization conditions, and
  (C) allowing the reaction mixture to react thereby forming polycarbonate, wherein the polycarbonate has a Mw (PC) greater than 9,000,
  thereby producing polycarbonate, wherein the polycarbonate comprises at least 20 mol % repeat units derived from the first dihydroxy compound and wherein the polycarbonate is amorphous.

14. The method of claim 13, wherein the polycarbonate has a Mw (PC) of at least 15,000 g/mol.

15. The method of claim 13, wherein the dihydroxy component further comprises a second dihydroxy compound.

16. The method of claim 13, wherein the second dihydroxy is BPA.

17. The method of claim 13, wherein the mole ratio of the first dihydroxy compound to the total amount of dihydroxy compounds present in the dihydroxy component is between 70:30 and 30:70.

18. The method of claim 17, wherein the mole ratio of the first dihydroxy compound to the total amount of dihydroxy compounds present in the dihydroxy component is between 60:40 and 40:60.

19. The method of claim 13, wherein the dihydroxy component consists of the first dihydroxy compound.

* * * * *